(12) United States Patent
Rinker et al.

(10) Patent No.: US 10,305,153 B2
(45) Date of Patent: May 28, 2019

(54) MICRO HEAT EXCHANGERS AND METHODS FOR USE IN THERMAL MANAGEMENT OF TRANSPORTATION VEHICLE BATTERIES

(71) Applicant: GM Global Technology Operations LLC, Detroit, MI (US)

(72) Inventors: Teresa J. Rinker, Royal Oak, MI (US); Debejyo Chakraborty, Novi, MI (US); Ryan C. Sekol, Grosse Pointe Woods, MI (US); Jeffrey A. Abell, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 422 days.

(21) Appl. No.: 15/017,092

(22) Filed: Feb. 5, 2016

(65) Prior Publication Data
US 2016/0233564 A1    Aug. 11, 2016

Related U.S. Application Data

(60) Provisional application No. 62/112,624, filed on Feb. 5, 2015.

(51) Int. Cl.
*H01M 10/6556* (2014.01)
*H01M 10/625* (2014.01)
(Continued)

(52) U.S. Cl.
CPC ..... *H01M 10/6556* (2015.04); *B60L 11/1874* (2013.01); *B60L 11/1875* (2013.01);
(Continued)

(58) Field of Classification Search
CPC ......... H01M 10/6556; H01M 10/6567; H01M 10/625; H01M 10/6554; H01M 10/6553;
(Continued)

(56) References Cited

U.S. PATENT DOCUMENTS

| | | | |
|---|---|---|---|
| 6,575,258 B1 * | 6/2003 | Clemmer | B60K 11/02 165/41 |
| 8,541,875 B2 | 9/2013 | Bennion et al. | |

(Continued)

OTHER PUBLICATIONS

Carlos F. Lopez et al., "Exploring the Efficacy of Nanofluids for Thermal Management in Lithium-Ion Battery Systems", May 14, 2014, ECS Meeting Abstracts, ECS Digital Library.
(Continued)

*Primary Examiner* — Lisa S Park
(74) *Attorney, Agent, or Firm* — Parks IP Law LLC

(57) ABSTRACT

A vehicle-battery system including a battery cell and a micro heat exchanger. The micro heat exchanger includes at least one fluid tube positioned in direct contact with the battery cell. The fluid tube comprises a heat-transfer tube section positioned between a fluid tube entrance and exit and in direct contact with the battery cell. The fluid tube is configured to receive a heat-transfer fluid, such a nanofluid, and channel the heat-transfer fluid through the heat-transfer tube section, to the fluid tube exit. The heat-transfer fluid is configured to cool or heat the battery cell when, in operation of the vehicle-battery system, the heat-transfer fluid is channeled through the heat-transfer tube section. The technology in various embodiments also includes a fluid modification device and a computerized controller for controlling the fluid modification device or other operations of the system such as pumping of the heat-transfer fluid.

20 Claims, 6 Drawing Sheets

(51) Int. Cl.
    B60L 11/18      (2006.01)
    H01M 10/633    (2014.01)
    H01M 10/6567   (2014.01)
    H01M 10/6553   (2014.01)
    H01M 10/6554   (2014.01)

(52) U.S. Cl.
    CPC ..... *H01M 10/625* (2015.04); *H01M 10/6567* (2015.04); *H01M 10/6553* (2015.04); *H01M 10/6554* (2015.04); *H01M 2220/20* (2013.01)

(58) Field of Classification Search
    CPC ............ H01M 2220/20; B60L 11/1874; B60L 11/1875
    See application file for complete search history.

(56) References Cited

U.S. PATENT DOCUMENTS

| | | | |
|---|---|---|---|
| 8,968,820 | B2 | 3/2015 | Zhamu et al. |
| 2007/0039721 | A1* | 2/2007 | Murray ............... C09K 5/10 165/109.1 |
| 2007/0253888 | A1* | 11/2007 | Liu ................... B82Y 30/00 423/447.1 |
| 2009/0126922 | A1* | 5/2009 | Vetrovec ............. F25B 21/00 165/185 |
| 2009/0305135 | A1 | 12/2009 | Shi et al. |
| 2011/0001081 | A1* | 1/2011 | Singh ................. C09K 5/10 252/73 |
| 2012/0040210 | A1* | 2/2012 | Hermann ............ H01M 16/006 429/9 |
| 2012/0186789 | A1 | 7/2012 | Sedarous et al. |
| 2013/0148301 | A1* | 6/2013 | Dede ................ F25B 21/00 361/702 |

OTHER PUBLICATIONS

Yang Li et al., "Liquid Cooling of Tractive Lithium Ion Batteries Pack with Nanofluids Coolant", Journal of Nanoscience and Nanotechnology, Apr. 4, 2015, pp. 3206-3211, vol. 15, No. 4, American Scientific Publishers.
"Virtual Hybrid Battery System", Impact Lab, Jun. 29, 2013.
Else Tennessen, "Nanofluids improve performance of vehicle components", Argonne National Laboratory, Mar. 9, 2012.
"Smart heating and cooling with nanofluids", Innovations Report, Forum for Science, Industry and Business, Mar. 12, 2009.
Ali Ijam et al., Nanofluid as a coolant for electronic devices (cooling of electronic devices), ScienceDirect, Applied Thermal Engineering, Jan. 2012, pp. 76-82, vol. 32.
P. Sivashanmugam, "Application of Nanofluids in Heat Transfer", InTech.
B. Kirubadurai et al., "Heat Transfer Enhancement of Nano Fluids—A Review", IJRET: International Journal of Research in Engineering and Technology, Jul. 2014, pp. 483-486, vol. 3, No. 7.
Li Jiang et al., "Thermo-Mechanical Reliability of Nano-Silver Sintered Joints versus Lead-Free Solder Joints for Attaching Large-Area Silicon Devices", SAE International, Nov. 2, 2010.
D. Shin et al., "Enhanced Specific Heat Capacity of Molten Salt-Metal Oxide Nanofluid as Heat Transfer Fluid for Solar Thermal Applications", Sae International, Nov. 2, 2010.
G. Huminic et al., "The Cooling Performances Evaluation of Nanofluids in a Compact Heat Exchanger", SAE International, Apr. 16, 2012.
"Nanofluid Tapped to Cool Servers", Electronics Cooling, Liquid Cooling, Sep. 14, 2010.
Saeil Jeon et al., "Investigation of Thermal Characteristics of Nanofluids During Flow in a Micro-channel Using an Array of Surface Temperature-Nano-Sensors", SAE International, Nov. 2, 2010.
Robert P. Scaringe et al., "The Heat Transfer Effects of Nanotube Surfaces Treatments and a Means for Growing the Nanotube Coated Surfaces", SAE International, Nov. 7, 2006.
J.R. Patel et al., "Effect of Nanofluids and Mass Flow Rate of Air on Heat Transfer Rate in Automobile Radiator by CFD Analysis", IJRET: International Journal of Research in Engineering and Technology, Jun. 2014, p. 25, vol. 3, No. 6.
Purna Chandra Mishra et al., "Application and Future of Nanofluids in Automobiles: An Overview on Current Research", ResearchGate, 2nd KIIT International Symposium on Advances in Automotive Technology.
Yi-Hsuan Hung et al., "Multiwalled Carbon Nanotube Nanofluids Used for Heat Dissipation in Hybrid Green Energy Systems", Journal of Nanomaterials, 2014, Hindawi Publishing Corporation.
Ching-Song Jwo et al., "Performance of Overall Heat Transfer in Multi-Channel Heat Exchanger by Alumina Nanofluid", ScienceDirect, Elsevier, Journal of Alloys and Compounds, Aug. 2010, pp. S385-S388, vol. 504, Supplement 1.
"Powertrain Thermal Management", Automotive Research Center, A U.S. Army Center of Excellence for Modeling and Simulation of Ground Vehicles led by the University of Michigan, pp. 1-2.
Nazih A. Bin-Abdun et al., "The Performance of a Heat Exchanger Designed for Cooling Electric Vehicle Car Battery System by Use Base Fluid and Nano-Fluid", ResearchGate, Mar. 2015.
"Experimental Thermal and Fluid Science", ScienceDirect, Sep. 2014, pp. 1-434, vol. 57.
"FleX Silicon-on-Polymer", American Semiconductor, Apr. 16, 2016, pp. 1-5, Abstract Only.
Joachim N. Burghartz, "Make Way for Flexible Silicon Chips", IEEE Spectrum, Feb. 25, 2013, pp. 1-7, Abstract Only.
Jhonathan Prieto Rojas et al., "Transformational Silicon Electronics", ACS Publications, Jan. 29, 2014, pp. 1468-1474, Abstract Only.
Debendra K. Das et al., "Performance of Nanofluids in Microchannel Heat Exchangers", Abstract Only.

\* cited by examiner

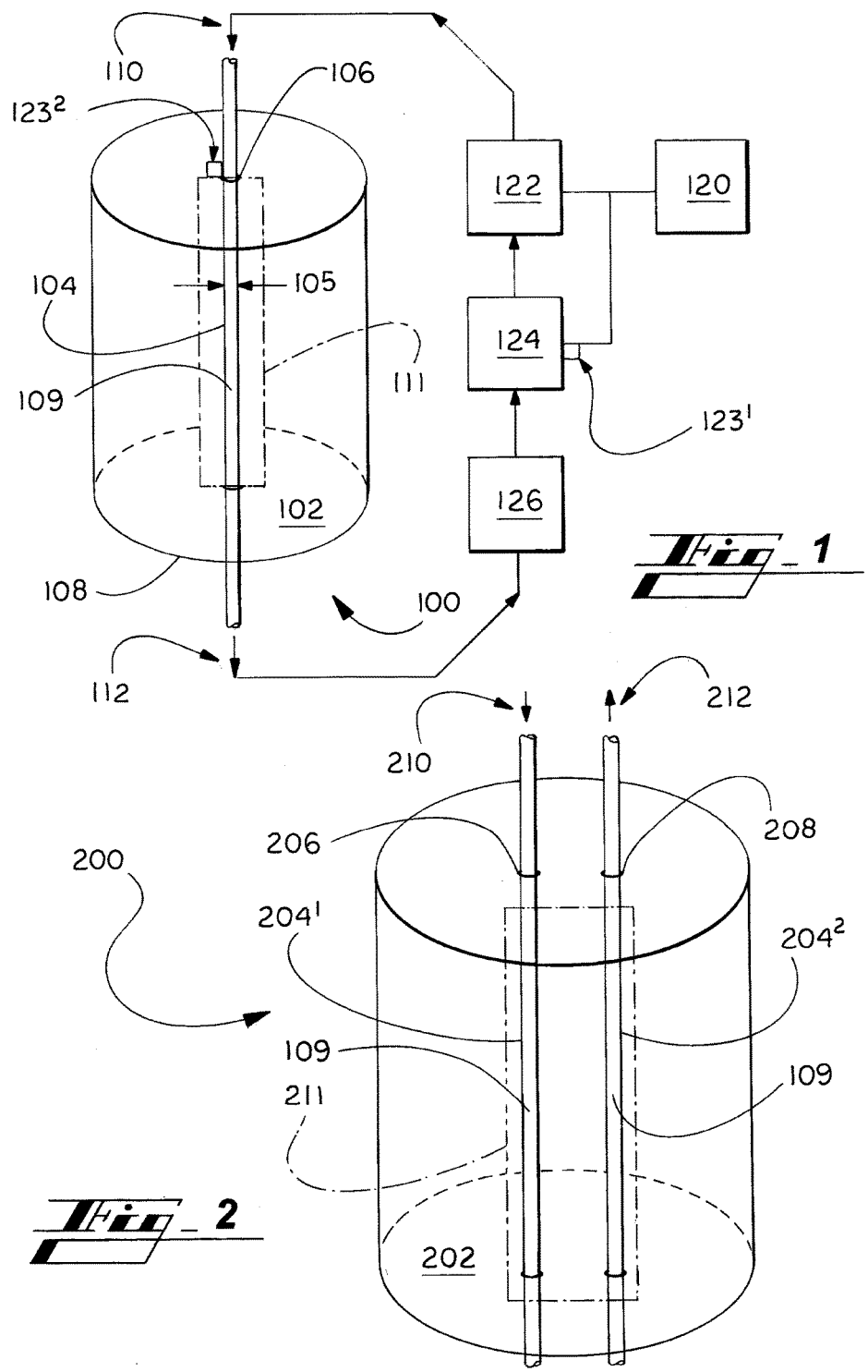

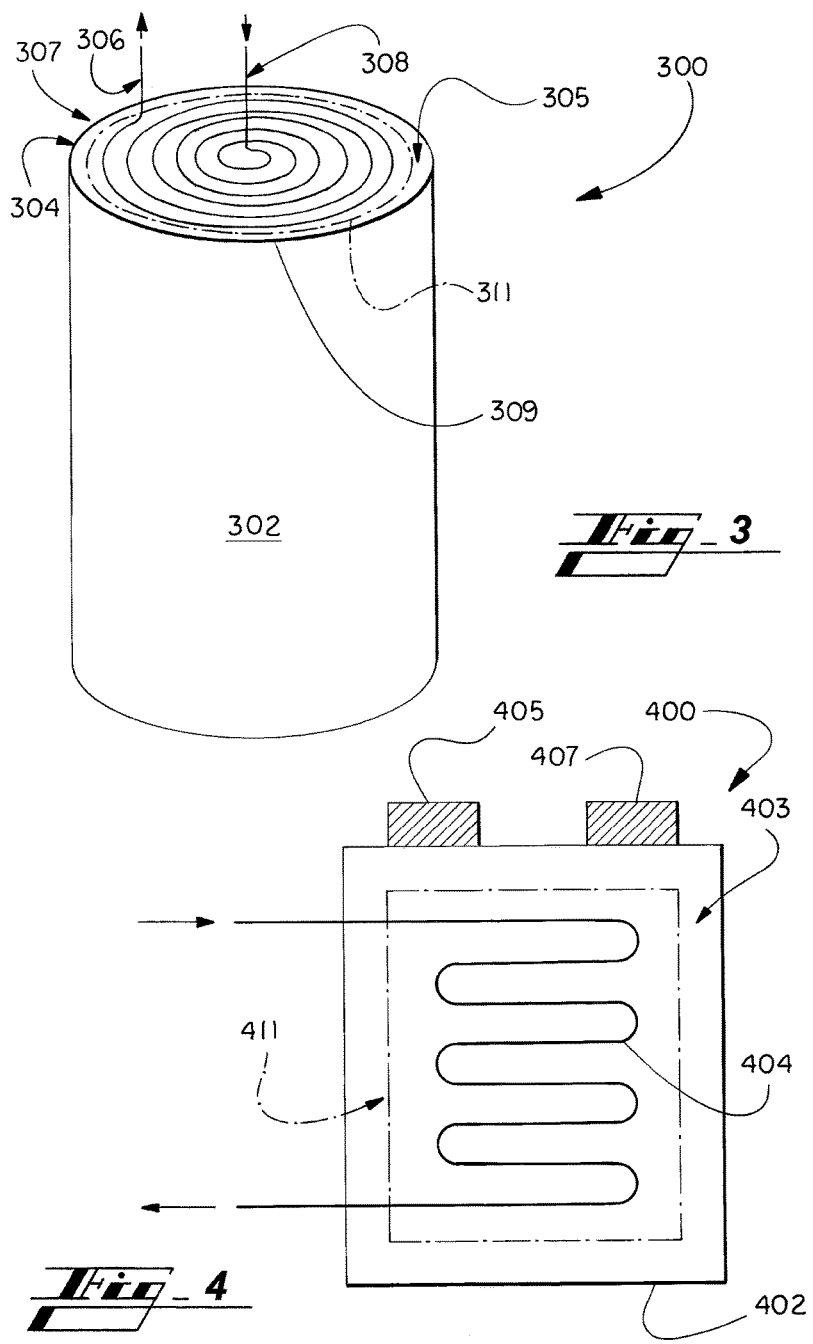

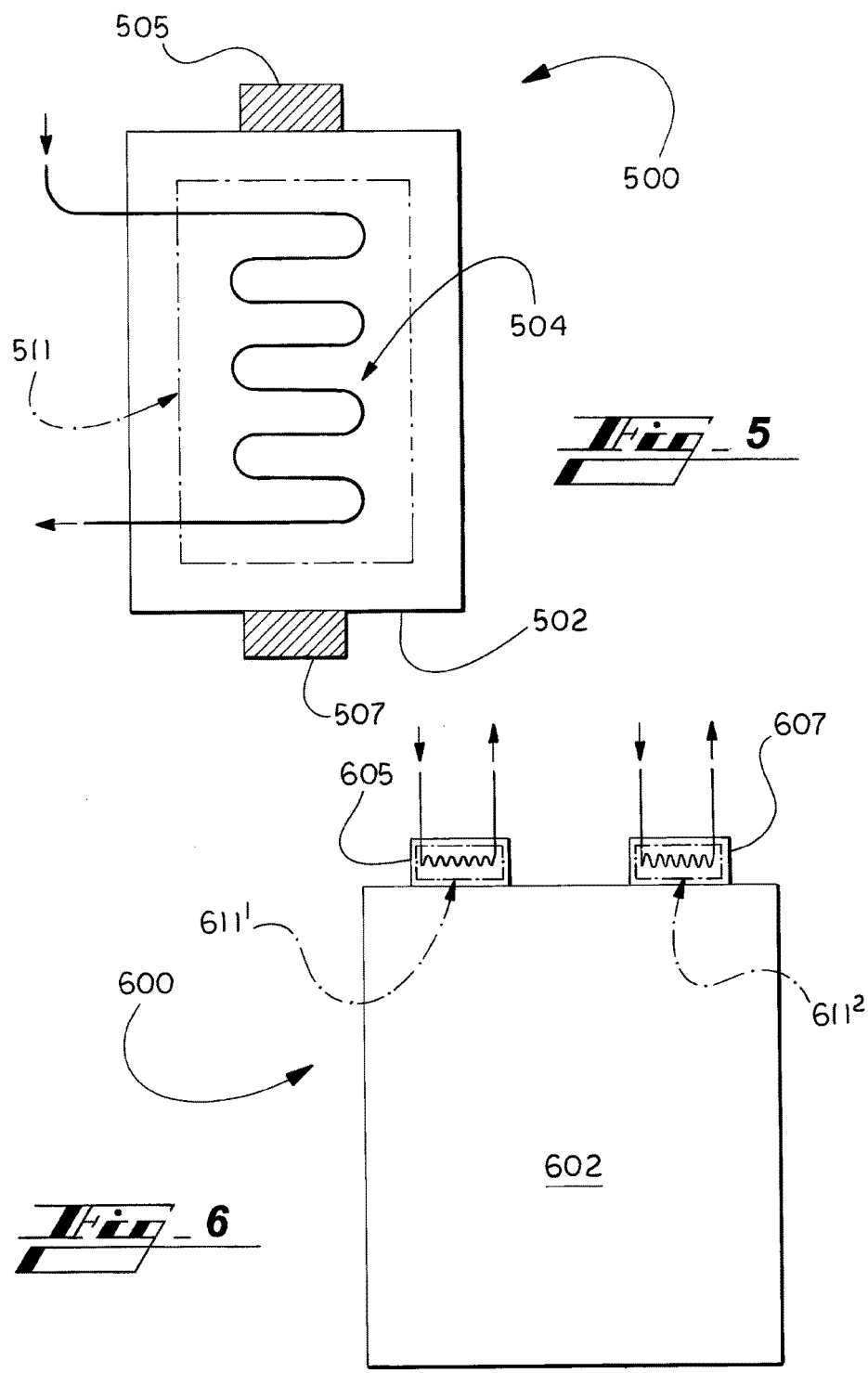

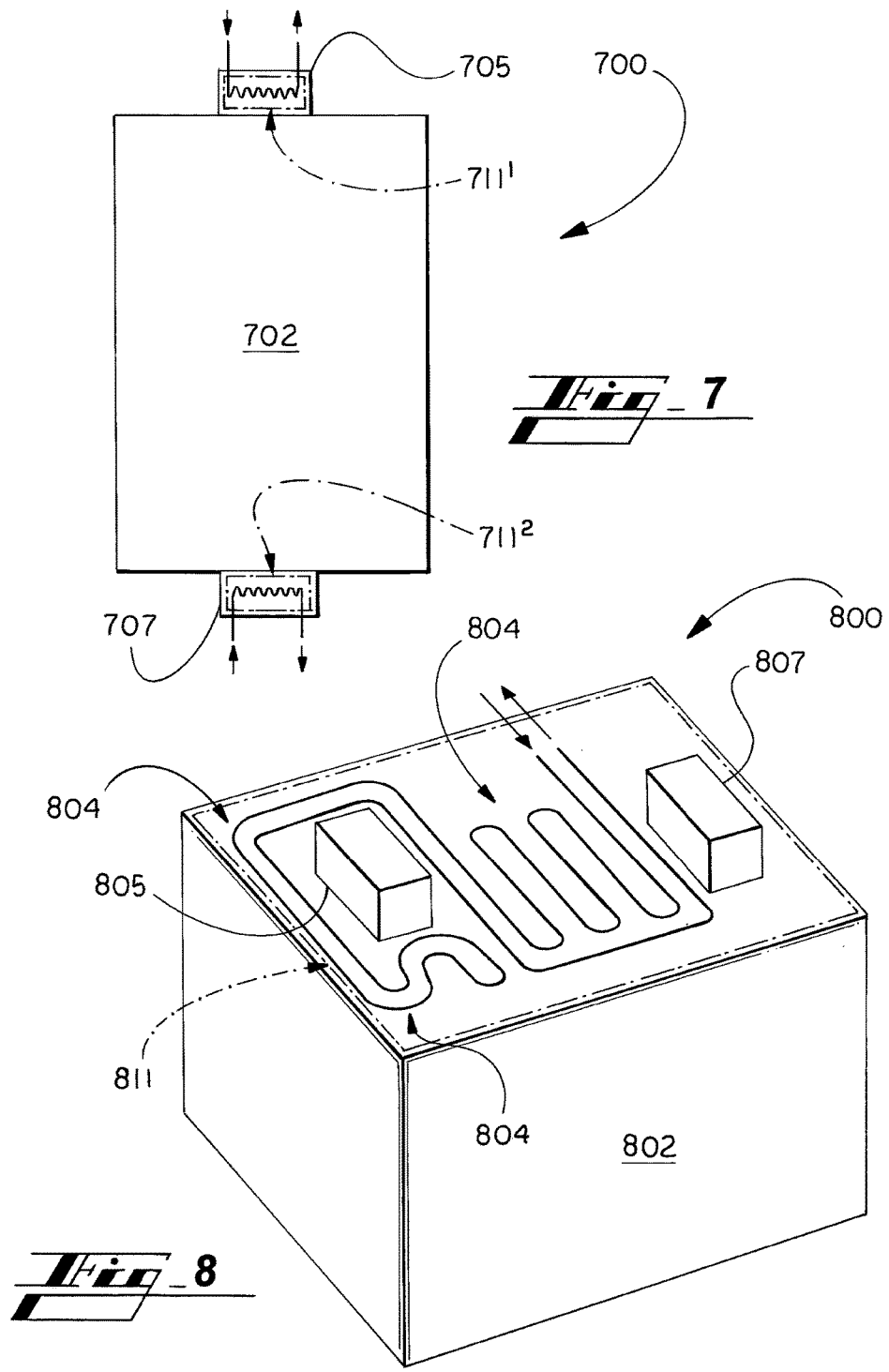

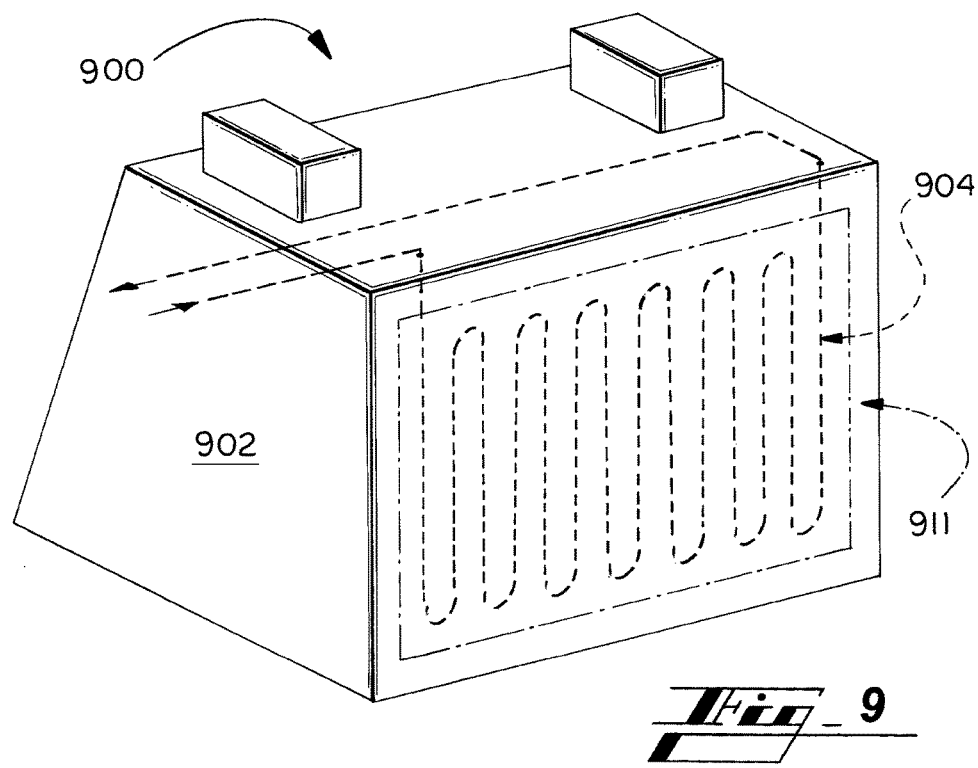
*Fig_9*
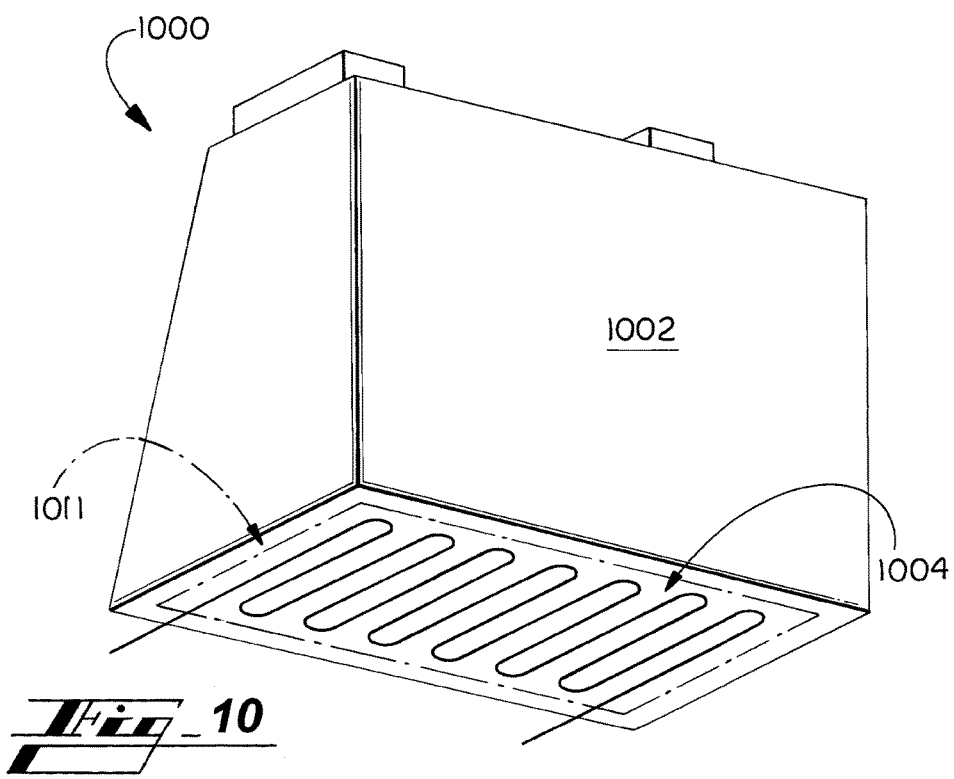
*Fig_10*

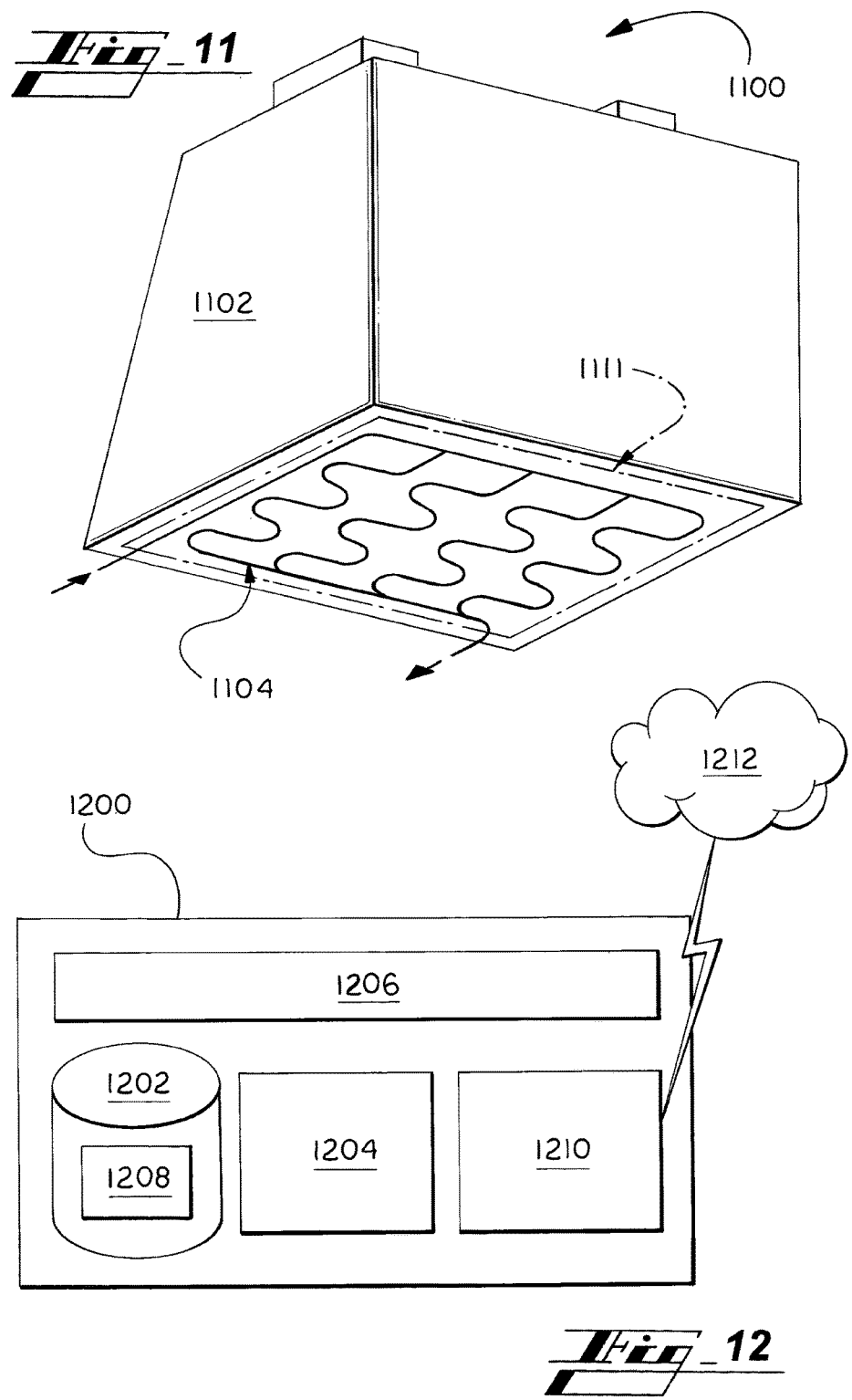

MICRO HEAT EXCHANGERS AND METHODS FOR USE IN THERMAL MANAGEMENT OF TRANSPORTATION VEHICLE BATTERIES

TECHNICAL FIELD

The present disclosure relates generally to systems and methods for managing transportation vehicle battery temperature and, more particularly, to vehicle battery thermal conditions using nanofluid, or other conventional heat transfer fluid—e.g., a coolant or refrigerant—passed through specially configured micro heat exchangers.

BACKGROUND

Transportation vehicle batteries, such as lithium-ion batteries, operate optimally when kept within a target temperature range. Getting the battery quickly to, and keeping the battery within, the target range involves selective heating and cooling the battery, respectively.

Conventional vehicle battery heating techniques include close-coupling the battery near an engine, or adjacent a pre-heated heating element.

Conventional vehicle battery cooling techniques include positioning cooling fins on the battery. Another technique is pumping a cooling fluid, or coolant, from a holding tank to pass adjacent the battery.

While helpful, conventional techniques have shortcomings including taking up an undesirably high amount of space, high cost in some cases, and not heating or cooling as efficiently or effectively as desired.

SUMMARY

The present technology relates to systems and methods for managing vehicle battery temperature. The systems include one of a variety of micro heat exchangers.

The micro heat exchangers are positioned at predetermined positions within and/or at a surface of the battery.

The micro heat exchangers, in various embodiments, use a custom-made or pre-selected fluid, such as a nanofluid, or a microfluid having target characteristics. Target characteristics can include, for instance, super heating and/or super cooling, or an ability to absorb, carry, and/or deliver heat to or from the battery with much greater efficiency than conventional coolants or refrigerants, such as traditional automotive engine coolant.

In various embodiments, the micro heat exchangers are used to cool vehicle batteries, and in some embodiments, the micro heat exchangers are used to heat batteries.

Improved thermal management of vehicle batteries would have benefits including allowing design and use in vehicles of batteries having higher energy densities, allowing design and use of larger batteries, and facilitating higher performance from existing batteries. Benefits of the present technology also include space savings in the vehicle.

Other aspects of the present technology will be in part apparent and in part pointed out hereinafter.

DESCRIPTION OF THE DRAWINGS

FIGS. 1-11 illustrate battery thermal-management systems according to various embodiments.

FIG. 12 illustrates an example controller, or computing architecture, being part of or used with any of the systems described herein.

The figures are not necessarily to scale and some features may be exaggerated or minimized, such as to show details of particular components.

In some instances, well-known components, systems, materials or methods have not been described in detail in order to avoid obscuring the present disclosure.

DETAILED DESCRIPTION

As required, detailed embodiments of the present disclosure are disclosed herein. The disclosed embodiments are merely examples that may be embodied in various and alternative forms, and combinations thereof. As used herein, for example, exemplary, and similar terms, refer expansively to embodiments that serve as an illustration, specimen, model or pattern.

Specific structural and functional details disclosed herein are not to be interpreted as limiting, but merely as a basis for the claims and as a representative basis for teaching one skilled in the art to variously employ the present disclosure.

While the present technology is described primarily herein in connection with transportation vehicles or modes of travel, and particularly with respect to automobiles, the technology is not limited to vehicles or modes of travel. The concepts can be used in a wide variety of applications, such as in connection with batteries of aircraft, marine craft, non-transportation machines, such as consumer goods and appliances, as examples.

Any component shown or described as a single item in the figures can be replaced by multiple such items configured to perform functions provided in connection with the single item. Similarly, any multiple items shown or described can be replaced by a single item configured to perform the functions provided in connection with the multiple items.

Directional references are provided herein mostly for ease of description and for simplified description of the example drawings, and the thermal-management systems described can be implemented in any of a wide variety of orientations. References herein indicating direction are not made in limiting senses. For example, references to upper, lower, top, bottom, or lateral, are not provided to limit the manner in which the technology of the present disclosure can be implemented. While an upper surface is referenced, for example, the referenced surface can, but need not be vertically upward, or atop, in a design, manufacturing, or operating reference frame. The surface can in various embodiments be aside or below other components of the system instead, for instance.

I. GENERAL OVERVIEW OF THE DISCLOSURE

The present disclosure describes micro heat exchangers configured and arranged for use in managing temperature of transportation vehicle batteries. The micro heat exchangers, or at least thermal-transfer components thereof, are positioned at predetermined positions on one or more generally internal battery components and/or at an exterior surface of the battery, allowing for more design flexibility. Example thermal-transfer components include channels for cooling and/or heating.

The micro heat exchanger, or at least the thermal-transfer components thereof, can be positioned, for instance, on tabs of the battery, on a bus bar of the battery, whether the bus bar is fully or partially solid or fully or partially hollow, or on one or more cells of the battery, such as on a surface and/or within the cell, for any form factor.

The cooling systems according to various embodiments of the present technology are used on a relatively small scale, and can therefore be referred to as compact. Embodiments implemented fully or partially within a battery, or in interstices of the battery, can be referred to as being compact, being specially configured to be integrated for use within an especially small compartment or area of the battery.

In one embodiment, the technology involves an integrated microelectromechanical (MEM) device being part of, or positioned in or on, a battery component. The device can include or be referred to as a micro heat exchanger (MHE). The term micro heat exchanger is used primarily herein.

Micro heat exchangers in various embodiments use a custom-made or pre-selected fluid, such as a nanofluid, or a microfluid, having desired characteristics. A microfluid can be described as a fluid comprising micro-sized particles (including smaller, e.g., nano-sized), or simply fluids capable of effective movement through micro channels (including smaller).

Characteristics of the fluid can include, for instance, super heating and/or super cooling, or an ability to absorb, carry, and/or deliver heat with much greater efficiency than conventional materials, such as traditional automotive engine coolant regarding cooling functions.

The micro heat exchanger fluid can be distributed within the system in any of a wide variety of methods without departing from the scope of the present technology, including using any of valves, switches, and manifolds.

The fluid can be moved within the micro heat exchanger actively, such as by pump, pull or vacuum, and/or what can be referred to as passively, or less active, such as by capillary action, convection, gravity, or heat-gradient currents, or a combination of any of these. Passive motivation can be controlled in any of various ways including, for example, by adjusting a surface tension of the heat exchange fluid and/or by other forces such as gravity.

II. FIG. 1

Now turning to the figures, and more particularly the first figure, FIG. 1 illustrates an example compact thermal-management system 100 according to the present technology. The thermal-management system 100 can also be referred to by other descriptive terminology, such as a thermal-control system, a temperature-control system, a temperature-management system, or the like.

The thermal-management system 100 is configured for use with a battery cell 102, such as a vehicle battery cell, to be used to power an electric or hybrid vehicle. The thermal-management system 100 comprises a micro heat exchanger configured and arranged for use in managing temperature of the battery cell 102.

Any of the features (systems, devices, sub-systems, components, etc.) described herein can be combined or separated in manufacturing or delivery, such as to be delivered and/or sold separately or together, such as in a kit. In one embodiment, the thermal-management system 100 and battery cell 102 are considered a part of a single apparatus. For instance, a company can manufacture the battery for receiving the thermal-management system 100. The same or a different entity can provide the thermal-management system 100 with the specially designed battery, either as a kit for assembly and use, or already assembled, or provide the thermal-management system 100 separately from the specially designed battery.

The example battery cell 102 in FIG. 1 is a cylindrical cell, and can be a lithium-ion battery cell, such as an "18650" battery. As other example, embodiments of the thermal-management system 100 could have other sizes or styles, such as the "18350," "18500," or other rechargeable battery cell types.

The thermal-management system 100 includes a micro heat exchanger fluid pathway, or channel 104. While the channel 104 can be configured and arranged in or about the battery 102 in any of a variety of ways without departing from the scope of the present technology, in the embodiment illustrated, the fluid channel 104 extends generally through, or within, the battery cell 102. Particularly, the fluid channel 104 passes generally through the battery cell 102 along an axial, center line of the battery cell 102.

The term micro heat exchanger (MHE) in various embodiments refers to the entire thermal management system 100, or particularly to components of the thermal-management system 100 (e.g., fluid channels 104) positioned within and/or otherwise on or at the battery cell 102, as just a few examples. According to one perspective, the micro heat exchanger of the thermal-management system 100 of FIG. 1 is considered to include primarily the micro fluid channeling 104 within the thermal-management system 100, which feature is called out generally and schematically by reference numeral 111.

While micro heat exchangers are called out by lining in the figures (e.g., MHE 111, 211, 311, etc.), the indication does not necessarily require that the thermal-management system 100 include structure corresponding to the lining. The thermal-management system 100 in some embodiments include structure corresponding to the lines shown—e.g., a MHE body, or components connecting the fluid channels 104—while in other embodiments the lining does not indicate an actual structure.

The thermal-management system 100 can include any one or more of a wide variety of materials without departing from the scope of the present disclosure. Material must be configured to accommodate the fluid temperatures and any other effects to which the thermal-management system 100 may be exposed, such as thermal energy directly or indirectly from the battery 102. As an example, the micro heat exchanger fluid channel 104 can include silicon, steel, copper, aluminum, etc.

The micro heat exchanger fluid channel 104 can have any of a variety of shapes and sizes. As an example, in various embodiments the channel 104 is generally round, rounded (e.g., oval), square or otherwise rectangular in cross section, has more than one of these shapes at various places, or has any other suitable geometry.

Regarding size, in various embodiments the micro heat exchanger fluid channel 104 has an outside diameter 105 of between about 1 µm and about 100 µm. While the micro heat exchanger fluid channel 104 can have other wall thicknesses, in one embodiment the channel 104, at least within and/or adjacent a battery component(s) being cooled, has a wall thickness of between about 10 nm and about 1000 nm.

One benefit of the channel 104 being relatively small and having sufficient wall thickness for robust operation is that the channel 104 will not collapse in use.

The thermal-management system 100 further includes at least two fluid openings or orifices 106, 108. The fluid orifices 106, 108 may be outfitted with input/output components (washers, ports, alignment parts, etc.; not shown in detail). At least one of the orifices 106, 108 can be used for fluid input and the other 108, 106 for output. In a contemplated embodiment, the thermal-management system 100 comprises a vent (e.g., air vent; not shown in detail), such as on the channel 104, to facilitate movement of fluid into, though, and/or out of the fluid channel 104, such as by relieving pressure build up that would otherwise impede fluid flow.

The input and output components of this embodiment, as with all input and output components herein, can take any of a wide variety of forms without departing from the scope of the present technology. The components may include valves, ports, manifold arrangements, couplings, combinations of these, or similar features.

Further regarding size of the micro heat exchanger fluid channel 104, in one embodiment the channel 104 extends between the input 106 and the output 108 with a length dependent on the size of the battery.

For cooling functions, the fluid channel 104 is filled with a cooled fluid, such as a chilled nanofluid. For heating functions, the fluid channel 104 is filled with a heated fluid, again such as a heated nanofluid. In a contemplated embodiment, the same fluid is used for heating and cooling, in turn, in the same micro heat exchanger for selectively heating (e.g., at cold-temperature starts for automobiles) and cooling (e.g., during extended electric vehicle use) a battery.

The thermal-management fluid is referenced by number 109 in FIG. 1 and its flow is indicated schematically by arrows leading into and out of the fluid channel 104, and labeled by reference numerals 110, 112.

Any of a wide variety of fluids can be used with the present technology. Example fluids include nanofluids or microfluids engineered to have desired characteristics for use in the present micro heat exchanger. Example fluids are described further in the 'Example Fluid Engineering and Types' section (section XIV.), below.

While nanofluid is described primarily as the applicable fluid 109 herein, any embodiment described can be implemented with another appropriate fluid configured to achieve the stated purposes and goals, such as a microfluid engineered to have desired features, including ability to be heated, super heated, chilled, or super chilled, for use in heating or cooling the battery according to the present technology.

The chilled nanofluid 109 can be referred to as 'cold nanofluid,' or simply as a chilled or cold fluid to accommodate use of other appropriate fluids. Make-up, chilling, flow, and other features for the cold fluid are provided below. Similarly, heated nanofluid 109 can be referred to as 'hot nanofluid,' or simply as a heated or hot fluid. Make-up, heating, chilling, flow, and other features associated with the fluid are provided below.

The nanofluid 109 (or other suitable fluid) can be cooled to any appropriate temperature for the implementation. Various considerations for determining a temperature or temperature range to cool the nanofluid 109 to or maintain it at can be considered. Example considerations include an amount and cost of energy required to obtain a target temperature. Another example consideration is a benefit or value of further cooling—e.g., avoiding chilling to or below a temperature below which there will be small or diminishing relative returns.

In some implementations, the nanofluid 109 is cooled and controlled so as not to fall below a predetermined minimum temperature and/or so as not to rise above a predetermined maximum temperature—e.g. to stay within a pre-set, target range for the chilled fluid.

In some embodiments, the nanofluid 109 is cooled to a temperature determined as a function of one or more factors. The factors can include a crystallization rate, or freezing point for a component of the thermal-management system 100 or the battery 102.

The thermal-management system 100 can include or be associated with heating equipment, to heat the nanofluid 109 as desired. The equipment can be a part of the reservoirs as mentioned, for example. In one embodiment, the heating equipment is controlled by circuitry, such as by the controller 120. The reservoirs are described further below in connection with reference numeral 126.

The nanofluid 109 can be pre-heated to any appropriate temperature for the application. Various considerations for determining a temperature or temperature range to heat to or maintain, can be processed, as with cooling implementations. Example considerations for heating include an amount and cost of energy required to obtain a target temperature, and the value of further thermal adjustment, such as heating—e.g., avoiding heating the battery too long during freezing-weather start up, and to a temperature above which there will be small or diminishing relative returns.

In some implementations, the nanofluid 109 is heated and controlled so as not to rise above a predetermined maximum temperature and/or so as not to fall below a predetermined minimum temperature—e.g. to stay within a pre-set, target range for the heated fluid.

In some embodiments, the nanofluid 109 is heated to a temperature determined as a function of one or more factors. Factors can include, for example, a melting point of one or more components of the battery 102 or system 100, or the melting point minus a factor such as a percentage of the melting point or a pre-set off-set temperature value.

The nanofluid 109 (or other suitable fluid) can be moved through the thermal-management system 100 in any of a variety of ways including by one or more ways, which can be referred to as active and passive, or less active, as mentioned above. Example active means include pushing or pulling, such as by an upstream or downstream pump. Example passive, or less-active, means include using capillary action, convection, gravity, or heat-gradient currents, or a combination of any of these.

Nanofluid 109 can be added to and/or moved through the system according to any appropriate timing. One goal of replacing, or replenishing the nanofluid 109 is maintaining a desired—e.g., predetermined—in-system fluid temperature and/or other fluid characteristics. Replenishing nanofluid could be used to maintain or keep a general desired or target temperature of the fluid 109 in the channel(s) 104, for example. Other fluid characteristics that can be controlled, such as magnetic polarity, are described below.

In various implementations, the nanofluid 109 is added and removed generally continuously to refresh the nanofluid 109 in the channel(s) 104 with fluid of the desired characteristic(s), for heating or cooling the battery 102, to maintain the desired thermal-management system 100 temperature as desired—e.g., as predetermined.

In various embodiments, some or all of the fluid control described is automated. The automated features may include, for instance, selectively heating or cooling the nanofluid 109, and selectively causing the nanofluid 109 to flow into or out of the thermal-management system 100, and at desired volumes, flow rates, temperature, and/or other characteristic(s) associated with the fluid.

For embodiments in which flow of the fluid 109 results at least partially from capillary action, the flow can controlled at least in part by, for example, adjusting a surface tension of the heat exchange fluid 109, such as a surface tension in the reservoir 126 described more below.

As mentioned, the nanofluid 109 can also be modified in terms of temperature and in other ways, by automated machinery and/or personnel using tools. Example modifications include changing a magnetic polarity of the nanofluid 109, changing the type or types of nanoparticles in the nanofluid 109, or by changing a concentration of any of the types of nanoparticles in the fluid 109, by adding or removing nanoparticles or base fluid to/from the nanofluid 109. The modification can thus include changing an effective ratio of fluid components, such as of base fluid to nanoparticles.

Example automated features are indicated schematically in FIG. 1, including a controller 120. The controller 120 is configured and arranged for communication with other components such as a pump 122 and/or a fluid modification device (FMD) 124. The configuration and arrangement of the controller 120 can include wired or wireless connection(s) to the pump 122 and/or FMD 124.

Fluid control can include monitoring of fluid characteristic, as mentioned, such as by closed-loop feedback. For instance, at least one sensor monitoring fluid temperature and/or other fluid characteristic (e.g., magnetic polarity, ratio of nanoparticles and base fluid) can be implemented at any of various portions of the arrangement. Example locations include any one or more of: an outlet of the FMD 124 (reference numeral 123[1]) an inlet of the FMD, and inlet to a reservoir 126, an outlet of the reservoir 126, an inlet of the sleeve system 100 (reference numeral 123[2]), and an outlet of the sleeve system 100. The feedback loop can have benefits for the controller including advising whether the FMD 125 is performing as it is being instructed to perform, whether the controller 120 is sending proper signals or should send different signals—e.g., a signal to heat more or change fluid composition in a different manner. The feedback can also promote efficiency, such as when the sensor is at the FMD inlet, in that the controller 120 can consider a particularly what change(s) need to be made to the fluid at the FMD 124 to reach a target fluid characteristic(s) pre-determined at the controller 120 (e.g., target temperature and/or composition).

The controller 120 is described further below, in section XIII., describing an example controller in the form of a computing system 1200 shown schematically in FIG. 12.

The thermal-management system 100 can include or be connected to the reservoir 126, holding the nanofluid 109 before and/or after it leaves the system channel(s) 104.

In some embodiments, the thermal-management system 100 includes or is connected to more than one reservoir 126. The reservoir 126 can hold the same or different types of nanofluids 109. The reservoirs 126 could also, whether holding the same or different types of nanofluid, maintain the nanofluids 109 at different temperatures. One of the reservoirs 126 could be a location at which chilled fluid is kept and/or fluid is chilled (at-reservoir chiller not shown in detail). One of the reservoirs 126 could be a location at which heated fluid is kept and/or fluid is heated (at-reservoir heater not shown in detail).

The reservoir 122 is a location where the nanofluid 109 can be added, removed, or replaced in mass. The nanofluid 109 can be added, removed, or replaced in various manners, such as partially or in total, at one time or over a period of time.

The nanofluid 109 can also be adjusted by the mentioned fluid-modification device (FMD) 124. The FMD 124 can include can include a heater and a chiller being part of or connected to cold and hot reservoirs 126, respectively. The FMD 124 can be integrated with, or as part of, the reservoir 126, or vice versa.

As mentioned, any component shown by a single item in the figures can be replaced by multiple such items, and any multiple items can be replaced by a single item. Here, for instance, though a single pump 122 is shown, the thermal-management system 100 can include or be connected to more than one pump 122.

Further regarding the FMD 124, it can be configured to alter the nanofluid 109 in any of a variety of ways toward accomplishing goals of the present technology. As mentioned, the FMD 124 can include, e.g., a heater, or heating device, a chiller, or cooling device to heat or cool nanofluid 109 passing through the FMD 124 to a specified temperature before it is pumped or otherwise caused or allowed to flow into the channel(s) 104 of the thermal-management system 100.

In one embodiment, the FMD 124 includes a material-adjusting component for changing a make-up or characteristic of the nanofluid 109, other than by only heating, or only cooling. The material-adjusting component can be configured to, for example, alter the nanofluid 109 in one or more ways, such as by changing a magnetic polarity of the nanofluid 109, changing the type or types of nanoparticles in the nanofluid 109, or by changing a concentration of any of the types of nanoparticles in the fluid 109, by adding or removing nanoparticles or base fluid to/from the nanofluid 109, to obtain desired qualities.

In embodiments in which the FMD 124 illustrated represents more than one FMD 124, or an FMD 124 with various functions (e.g., fluid heating and polarity change), the FMD 124 can include, for instance, one or both of a chiller and a material-adjusting component.

The thermal-management system 100 includes any appropriate piping, valves, switches, and the like for directing the nanofluid 109 between the various components described in operation of the thermal-management system 100.

With continued reference to FIG. 1, the intake, outtakes 106, 108 and channel(s) 104 can vary in design. The intake, outtakes 106, 108 can be, for example, of any number, size, shape, and position within the thermal-management system 100 without departing from the scope of the disclosure A designer of the system can engineer the fluid channel 104 in any of a wide variety of shapes—e.g., patterns—to achieve desired goals, including, for instance, heat-distribution, heat-absorption, or heat-delivery goals within the thermal-management system 100.

In some embodiments, as shown in FIGS. 4-11, at least a portion of the fluid channel(s) is generally serpentine, or winding. A benefit of this arrangement is that more of the channeling is adjacent more of a relevant body or surface of the battery 102 needing temperature change.

Other example distributions for the fluid channeling include cross-hatched pattern, a pin pattern, and a spiral or helicoid pattern. Other examples include manifold, single/multiple serpentines, parallel, and interdigitated.

The thermal-management system 100 can include or be associated with chilling equipment, to cool the nanofluid 109 as desired. The equipment can be a separate device, such as the FMD 124 as shown in FIG. 1, or such device can be a part of the reservoir 126, as mentioned, for example. In one embodiment, the chilling equipment is controlled by circuitry, such as by the controller 120.

As provided, the micro heat exchangers of the present technology can be configured for use in cooling and/or heating vehicle batteries. Keeping a battery operating as much as possible in its optimal temperature range has benefits, including greater battery energy densities, because a battery operated in its optimal temperature range delivers greater performance.

Heating a battery is advantageous in situations such as cold-weather use of the battery. Heating a battery quickly at startup in cold weather, for example, improves battery performance, because batteries tend to otherwise lose performance when operated at very cold temperatures, e.g., ambient, outside environment temperatures of 0 degrees Celsius or less.

Managing batteries in manners according to the present technology, using micro heat exchangers, has particular benefits including, by being a relatively smaller cooling and/or heating system, allowing for a more powerful, robust battery, by freeing up space for more battery cells in the battery pack. A result of the improved density is longer battery use on a charge and so longer range electric vehicles. Other benefits of the present technology are described below.

III. FIG. 2

FIG. 2 illustrates a battery-cooling system 200 according to another example embodiment of the present disclosure.

The embodiment of FIG. 2 is similar to that of FIG. 1. The embodiment of FIG. 2 comprises micro heat exchanger inputs and outputs 206, 208 positioned on generally the same side (e.g., top in the perspective of FIG. 2) of the subject battery cell 202 by which the micro heat exchanger cooling fluid—e.g., nanofluid 109—moves into 210 and out of 212 the apparatus.

The micro heat exchanger channeling 204 thus includes a single channel 204 that changes directions, forming two parts $204^1$, $204^2$ or two channels $204^1$, $204^2$ connected.

As for the embodiment of FIG. 1, the term micro heat exchanger can, in various embodiments associated with FIG. 2 and others herein, refer to the entire thermal management system 200 or particularly to components of the system 200 (e.g., fluid channels 204) positioned within and/or otherwise on the battery 202, as just examples.

According to one perspective, among others, the micro heat exchanger of the system 200 of FIG. 2 could be considered to include primarily the micro fluid channeling 204 within the system 200, which feature is called out generally and schematically by reference numeral 211.

The embodiment of FIG. 2 can otherwise be like the embodiments described above and below, and each similarity is not repeated here. Processes for controlling fluid temperature (e.g., heating and/or cooling), flow, non-temperature qualities, and timing of changes thereof, can be made according to any of the techniques described herein, including those described in connection with FIG. 1.

IV. FIG. 3

FIG. 3 illustrates a battery thermal-management system 300 according to another example embodiment of the present disclosure.

In the embodiment of FIG. 4, the micro heat exchanger fluid channel(s) 304 is positioned primarily on or at a surface 305 of the subject battery cell 302. As mentioned, fluid channels can be partially or fully within the battery cell (302) and so, here, the MHE fluid channel(s) 304 can in contemplated embodiments be embedded partially or fully below the surface 305.

The micro heat exchanger fluid channel(s) 304 is distributed on or at the surface in any effective pattern. In the illustrated example, the micro heat exchanger fluid channel(s) 304 is distributed in generally a coiled, helicoid, spiral, curled, or winding, shape, wherein fluid flows in 306 to the cell 302 adjacent, or closer to, a periphery 307 of the surface 305, and exits 308 the cell 302 adjacent or closer to a central portion or center 309 of the cell 302.

The term micro heat exchanger in some embodiments refers to the entire thermal management system 300 or particularly to components of the system 300 (e.g., fluid channels 304) positioned within and/or otherwise on the battery 302, as just two examples. According to one perspective, among others, the micro heat exchanger of the system 300 of FIG. 3 could be considered to include primarily the micro fluid channeling 304 within the system 300, which feature is called out generally and schematically by reference numeral 311.

The embodiment of FIG. 3 can otherwise be like the embodiments described above and below, and every similarity is not repeated here. Processes for controlling fluid temperature (e.g., heating and/or cooling), flow, non-temperature qualities, and timing of changes thereof, can be made according to any of the techniques described herein, including those described in connection with FIG. 1.

V. FIG. 4

FIG. 4 illustrates a battery thermal-management system 400 according to another example embodiment of the present disclosure.

The battery 402 can be a pouch-type battery. The battery 402 includes a pouch portion 403 and tabs 405, 407. The pouch portion can be referred to by other terms, such as a pouch section or, simply, a pouch.

The micro heat exchanger (e.g., reference numeral 411) in this embodiment includes a fluid channel 404 distributed through the pouch portion 403 of the battery 402.

The micro heat exchanger fluid channel(s) 404 is distributed through the pouch 403 in any effective manner, e.g., pattern. In the example shown, the channel 404 is distributed in a generally serpentine manner. While the distribution is shown in a generally two-dimensional manner, the distribution can include the channel 404 extending in various directions, such as into and out of the view of FIG. 4, along with back and further as it extends downward.

And the micro heat exchanger fluid channel(s) 404 can be distributed within and/or outside of—e.g., on a surface of—the pouch 403. The illustration of FIG. 4 is configured to show this embodiment schematically as well in the alternative.

Moreover, the micro heat exchanger fluid channel(s) 404 can be positioned generally in, at, and/or on any one or more of multiple sides or edges of the pouch 403, such as in, at, or on a front and/or a back of the pouch 403. The illustration of FIG. 4 is configured to show this embodiment schematically, as well, in the alternative.

The embodiment of FIG. 4 can otherwise be like the embodiments described above and below, and every similarity is not repeated here. Processes for controlling fluid temperature (e.g., heating and/or cooling), flow, non-temperature qualities, and timing of changes thereof, can be made according to any of the techniques described herein, including those described in connection with FIG. 1.

VI. FIG. 5

FIG. 5 illustrates a battery thermal-management system 500 according to another example embodiment of the present disclosure. The system 500 includes a micro heat exchanger 511 comprising at least one fluid channel 504.

The micro heat exchanger 511 of FIG. 5 can be generally like the micro heat exchanger 411 described above in connection with FIG. 4. A difference between the embodiments is that the battery 502 on which the micro heat exchanger 511 is used in the case of FIG. 5 has a different configuration than the battery 402 of FIG. 4.

Notably, the tabs 505, 507 of the battery 502 of the embodiment of FIG. 5 are positioned on opposing ends of the battery 502 in FIG. 5 as opposed to the tabs 405, 407 being at a common end of the battery 402 in FIG. 4.

The embodiment of FIG. 5 can otherwise be like the embodiments described above and below, and every similarity is not repeated here. Processes for controlling fluid temperature (e.g., heating and/or cooling), flow, non-temperature qualities, and timing of changes thereof, can be made according to any of the techniques described herein, including those described in connection with FIG. 1.

VII. FIG. 6

FIG. 6 illustrates a battery thermal-management system 600 according to another example embodiment of the present disclosure.

The battery 602 of the embodiment of FIG. 6 can be similar in ways to that of FIG. 4, also having tabs 605, 607 located at a common end of the battery 602.

The battery thermal-management system 600 comprises two micro heat exchangers $611^1$, $611^2$, each positioned in, at, and/or on a respective one of the battery tabs 605, 607.

The micro heat exchanger fluid channels within the micro heat exchangers $611^1$, $611^2$ are distributed on and/or through the tabs 605, 607 in any effective manner, e.g., pattern. In the example shown, the channel is distributed in a generally serpentine manner. While the distribution is shown in a generally two-dimensional manner, the distribution can include the channel extending in various directions, such as into and out of the tab as the tabs are shown in FIG. 6 (i.e., into and out of the paper, or view, of FIG. 6).

And the micro heat exchanger fluid channels of this embodiment can be distributed within and/or outside (e.g., on a surface) of the tabs 605, 607, and the illustration of FIG. 6 is configured to show this embodiment schematically as well in the alternative.

Moreover, the micro heat exchanger fluid channel(s) can be positioned generally in, at, and/or on any one or more of multiple sides or edges of the tabs 605, 607, such as in, at, or on a front and/or a back of the tabs 605, 607. The illustration of FIG. 6 is configured to show this embodiment schematically as well in the alternative.

The embodiment of FIG. 6 can otherwise be like the embodiments described above and below, and every similarity is not repeated here. Processes for controlling fluid temperature (e.g., heating and/or cooling), flow, non-temperature qualities, and timing of changes thereof, can be made according to any of the techniques described herein, including those described in connection with FIG. 1.

VIII. FIG. 7

FIG. 7 illustrates a battery thermal-management system 700 according to another example embodiment of the present disclosure.

From one perspective, the system 700 of FIG. 7 can be considered generally as a combination of the embodiments of FIGS. 5 and 6. The battery 702 is similar in ways to that of the embodiment of FIG. 5, and the micro heat exchangers $711^1$, $711^2$ are similar to the embodiment of FIG. 6.

Moreover, the fluid channels in the micro heat exchangers can be positioned generally in, at, and/or on any one or more of multiple sides or edges of the tabs 705, 707, such as in, at, or on a front and/or a back of the tabs 705, 707.

The embodiment of FIG. 7 can otherwise be like the embodiments described above and below, and every similarity is not repeated here. Processes for controlling fluid temperature (e.g., heating and/or cooling), flow, non-temperature qualities, and timing of changes thereof, can be made according to any of the techniques described herein, including those described in connection with FIG. 1.

IX. FIG. 8

FIG. 8 illustrates a battery thermal-management system 800 according to another example embodiment of the present disclosure.

The battery 802 of FIG. 8 can be referred to as a prismatic battery 802, or other terms such as a prismatic cell, a prismatic cell battery, or a prismatic can cell.

The micro heat exchanger 811 of the embodiment of FIG. 8 includes at least one fluid channel 804 distributed on, at, and/or within a surface of the battery 802.

The channel 804 is shown distributed adjacent tabs 805, 807 of the battery 802.

The micro heat exchanger fluid channel 804 within the micro heat exchanger 811 is distributed on and/or in the prismatic cell 802 in any effective manner, e.g., pattern. In the example shown, the channel 804 is in at least one portion distributed in a generally serpentine manner, and in other portions distributed in a manner suited for the space and component characteristics in the area. Again, goals for designing the channeling can include covering a large amount of the relevant areas and/or surfaces, e.g., as much as possible or practical under the circumstances, thereby promoting, or maximizing, heat transfer—e.g., selectively heating and/or cooling of the battery 802.

While distribution of the channeling 804 is shown in a generally two-dimensional manner, the distribution can include the channel extending in various directions, such as into and out of the battery 802.

And the micro heat exchanger fluid channels of this embodiment can be distributed within and/or outside (e.g., on a surface) of the battery 802, and the illustration of FIG. 8 is configured to show this embodiment schematically as well in the alternative.

Moreover, the micro heat exchanger fluid channel(s) 804 can be positioned generally in, at, and/or on any one or more of multiple sides or edges of the battery 802, such as in, at, or on a front and/or a back of the battery 802. As an example of the micro heat exchanger being positioned on another surface, FIG. 9 shows a system 900 according to an embodiment like that of FIG. 8, with a primary difference being that its micro heat exchanger 911 is positioned on a different surface (e.g., a back) of the battery 902 of FIG. 9.

As provided, embodiments can be used together. Thus, for instance, the embodiment of FIGS. 8, 9 can be combined, for multi-surface cooling by way of two separate micro heat exchangers, or a single combined micro heat exchanger, covering the two surfaces.

As another example of the micro heat exchanger being positioned on another surface, FIGS. 10 and 11 show system 1000, 1100 according to other embodiments, like that of FIGS. 8, 9 with a primary difference being that their micro heat exchangers 1011, 1111 are positioned on a different surface (e.g., a bottom) of the battery 1002, 1102.

The embodiment of FIG. 8 can otherwise be like the embodiments described above and below, and every similarity is not repeated here. Processes for controlling fluid temperature (e.g., heating and/or cooling), flow, non-temperature qualities, and timing of changes thereof, can be made according to any of the techniques described herein, including those described in connection with FIG. 1.

X. FIG. 9

FIG. 9 illustrates a battery thermal-management system 900 according to another example embodiment of the present disclosure.

As mentioned, FIG. 9 shows a system 900 according to an embodiment like that of FIG. 8, with a primary difference being that its micro heat exchanger 911, comprising micro heat exchanger fluid channeling 904, is positioned on a different surface (e.g., a back) of the battery 902 of FIG. 9.

As with the battery 802 of FIG. 8, the battery 902 of FIG. 9 can be referred to as a prismatic battery, or other terms such as a prismatic cell, a prismatic cell battery, or a prismatic can cell.

The embodiment of FIG. 9 can otherwise be like the embodiments described above and below, and every similarity is not repeated here. Processes for controlling fluid temperature (e.g., heating and/or cooling), flow, non-temperature qualities, and timing of changes thereof, can be made according to any of the techniques described herein, including those described in connection with FIG. 1.

XI. FIG. 10

FIG. 10 illustrates a battery thermal-management system 1000 according to another example embodiment of the present disclosure.

As mentioned, FIG. 10 shows a system 1000 according to an embodiment like that of FIGS. 8, 9, with a primary difference being that its micro heat exchanger 1011 is positioned on a different surface (e.g., a bottom) of the battery 1002 of FIG. 10.

As with the battery 802 of FIG. 8, the battery 1002 of FIG. 10 can be referred to as a prismatic battery, or other terms such as a prismatic cell, a prismatic cell battery, or a prismatic can cell.

The channeling 1004 of this embodiment is shown distributed in a generally serpentine pattern, but can be distributed in any suitable manner, as mentioned. FIG. 11 shows an example of alternative distribution of channeling at the same side (e.g., bottom) of the prismatic battery.

The embodiment of FIG. 10 can otherwise be like the embodiments described above and below, and every similarity is not repeated here. Processes for controlling fluid temperature (e.g., heating and/or cooling), flow, non-temperature qualities, and timing of changes thereof, can be made according to any of the techniques described herein, including those described in connection with FIG. 1.

XII. FIG. 11

FIG. 11 illustrates a battery thermal-management system 1100 according to another example embodiment of the present disclosure.

Like FIG. 10, FIG. 11 shows a system 1100 according to an embodiment like that of FIGS. 8 and 9, with a primary difference being that its micro heat exchanger 1111 is positioned on a different surface (e.g., a bottom) of the battery 1102 of FIG. 11.

As with the battery 802 of FIG. 8, the battery 1102 of FIG. 11 can be referred to as a prismatic battery, or other terms such as a prismatic cell, a prismatic cell battery, or a prismatic can cell.

The channeling 1104 of this embodiment is shown distributed in a generally serpentine pattern, but can be distributed in any suitable manner, as mentioned. FIG. 11 shows an example of alternative distribution of channeling at the same side (e.g., bottom) of the prismatic battery 1102, as compared with the embodiment of FIG. 10.

The embodiment of FIG. 11 can otherwise be like the embodiments described above and below, and every similarity is not repeated here. Processes for controlling fluid temperature (e.g., heating and/or cooling), flow, non-temperature qualities, and timing of changes thereof, can be made according to any of the techniques described herein, including those described in connection with FIG. 1.

XIII. FIG. 12

FIG. 12 illustrates an example controller 1200, or computing architecture, being part of or used with any of the systems described herein.

FIG. 12 shows an example controls system 1200, such as a computing apparatus, or computer. The system 1200 can constitute the controls 120, described above.

The controls system 1200 includes a memory, or computer-readable medium 1202, such as volatile medium, non-volatile medium, removable medium, and non-removable medium. The term computer-readable media and variants thereof, as used in the specification and claims, refer to tangible, non-transitory, storage media.

In some embodiments, storage media includes volatile and/or non-volatile, removable, and/or non-removable media, such as, for example, random access memory (RAM), read-only memory (ROM), electrically erasable programmable read-only memory (EEPROM), solid state memory or other memory technology, CD ROM, DVD, BLU-RAY, or other optical disk storage, magnetic tape, magnetic disk storage or other magnetic storage devices.

The controls system 1200 also includes a computer processor 1204 connected or connectable to the computer-readable medium 1202 by way of a communication link 1206, such as a computer bus.

The computer-readable medium 1202 includes computer-executable code or instructions 1208. The computer-executable instructions 1208 are executable by the processor 1204 to cause the processor, and thus the controller 1200, to perform any combination of the functions described in the present disclosure.

Example functions or operations described include controlling a temperature of nanofluid being introduced to the thermal-management system of any of the embodiments shown and described. Another example function is changing nanofluid composition in a pre-determined manner to expedite or otherwise effect as desired a heating or cooling process. Another example function includes controlling a flow or flow rate by which the nanofluid is caused to flow through any of the example thermal management systems described or shown.

The code or instructions 1208 can be divided into modules to perform various tasks separately or in any combination. The module can be referred to by any convenient terminology. One module, configured with code to control one or more characteristics of the nanofluid using an FMD, could be referred to as a fluid-modification module, a fluid-characteristic-control module, or the like, for instance.

The controller 1200 can also include a communications interface 1210, such as a wired or wireless connection and supporting structure, such as a wireless transceiver. The communications interface 1210 facilitates communications between the controller 1200 and one or more external devices or systems 1212, whether remote or local.

The external devices 1212 can include, for instance, a remote server to which the controls system 1200 submits requests for data and/or from which the controls system 1200 receives updates or instructions. The external device 1212 could include a computer from which the control system 1200 receives operating parameters, such as a target temperature(s) or target composition(s) for the nanofluid(s), changes that need to be made to meet the target(s), other characteristics for or related to the fluid, cooling times, nanofluid flow rates or flow/switch timing, or another system characteristic.

XIV. EXAMPLE FLUID ENGINEERING AND TYPES

The present technology in various embodiments includes or is used with any of a wide variety of thermal-management (e.g., heating and/or cooling) fluids, as mentioned. Example fluids include nanofluids and microfluids engineered to have desired characteristics for use in the micro heat exchangers disclosed herein.

Nanofluids are engineered colloidal suspensions of nanometer-sized particles in a base fluid. The nanoparticles are typically metals, oxides, carbides, or carbon nanotubes. Example base fluids include water, ethylene glycol, and oil.

Nanofluids are made to have unique properties, such as super-heating and/or super-cooling characteristics. A nanofluid could be engineered to have a thermal conductivity and convective-heat-transfer coefficient that are greatly enhanced over that of the base fluid, alone, for example. Engineering the fluid can include, for instance, magnetically polarizing the nanoparticles to obtain the desired qualities.

While the nanofluid can include other nanoparticles without departing from the present disclosure, in various embodiments, the nanofluid includes one or a combination of silicon nanoparticles and metal-based nanoparticles.

The nanofluid is for some implementations, surface functionalized. Surface functionalization of nanoparticles involves introducing functional groups (e.g., OH, COOH, polymer chains, etc.) to a surface of a nanoparticle. One characteristic of surface-functionalized nanofluids is increased particle dispersion in the nanofluid, which can be beneficial because increased thermal capacity, increased dispersion of thermal energy, and increased longevity of nanoparticle suspension. Another result is that conductive nanoparticles can be isolated using surface functionalization, which can be beneficial because of increased control over particle density in the fluid.

As also mentioned, while nanofluids are discussed herein as the primary fluid for use in the present systems, other fluids able to perform as desired can be used. The fluids can include, e.g., microfluids, including micro-sized particles in a base fluid, or simply fluids capable of effective movement through micro channels, such as those of the micro channels of the present technology.

XV. SELECT BENEFITS OF THE PRESENT TECHNOLOGY

Many of the benefits and advantages of the present technology are described herein above. The present section restates some of those and references some others. The benefits are provided by way of example, and are not exhaustive of the benefits of the present technology.

A compact micro device can be positioned on and/or integrated inside a battery cell, including battery cells having conventional external sizing and at least general geometry.

The present technology enables enhanced integrated battery cell cooling and/or heating by way of efficient thermal exchange during battery operation.

Another advantage of using a micro heat exchanger is that channels of the exchanger will not collapse due at least in part to their relatively small size, or size and geometry.

The present technology also improves, or allows for improved, battery energy density because a battery operated in its optimal temperature range delivers greater performance and a physically smaller heating and/or cooling system allows for more battery cells in the battery pack. A result of the improved density is longer battery use on a charge and in the automotive industry, for example, longer range electric vehicles.

The present technology also simplifies battery assembly at the plant or manufacturing level because the heating and/or cooling system could be integrated into the cells themselves. Thereby, for instance, work and time can be saved by a manufacturing company in not having to install ancillary cooling or heating equipment for the battery, the notably lower amount of componentry provided by the present technology.

The present technology also reduces vehicle or product weight associated with battery cooling and/or heating, and saves space. Relatively weighty and bulky conventional cooling components are not needed.

XVI. CONCLUSION

Various embodiments of the present disclosure are disclosed herein. The disclosed embodiments are merely examples that may be embodied in various and alternative forms, and combinations thereof.

The above-described embodiments are merely exemplary illustrations of implementations set forth for a clear understanding of the principles of the disclosure.

Variations, modifications, and combinations may be made to the above-described embodiments without departing from the scope of the claims. All such variations, modifications, and combinations are included herein by the scope of this disclosure and the following claims.

What is claimed:

1. A vehicle-battery system comprising:
   a battery cell;
   a micro heat exchanger comprising at least one fluid tube positioned in direct contact with the battery cell;
   wherein:
      the fluid tube comprises a fluid tube opening and a fluid tube exit, and a heat-transfer tube section positioned between the fluid tube opening and the fluid tube exit and in direct contact with the battery cell;
      the fluid tube is configured to receive a heat-transfer fluid via the fluid tube opening and channel the heat-transfer fluid, from the fluid tube opening, through the heat-transfer tube section, and to the fluid tube exit; and
      the heat-transfer fluid is configured to cool or heat the battery cell when, in operation of the vehicle-battery system, the heat-transfer fluid is channeled through the heat-transfer tube section;
   a fluid modification device in fluid communication with the fluid tube, the fluid modification device being configured to, in operation of the vehicle-battery system, modify at least one characteristic associated with the heat-transfer fluid in a predetermined manner to cool or heat the battery cell more effectively than the heat-transfer fluid would if not modified, wherein said at least one characteristic comprises at least one of:
a magnetic polarity of the heat-transfer fluid;
a type of nanoparticles in the heat-transfer fluid;
a concentration of nanoparticles in the heat-transfer fluid; and
a ratio of base fluid-to-nanoparticles of the heat-transfer fluid; and
a computerized controller configured:
for wired or wireless communication with the fluid modification device; and
to send a signal to the fluid modification device causing the fluid modification device to modify said characteristic.

2. The vehicle-battery system of claim 1 wherein:
the fluid tube is a first fluid tube and positioned within the battery cell; and the vehicle-battery system comprises a second fluid tube positioned in
direct contact with a surface of the battery cell.

3. The vehicle-battery system of claim 1 wherein the heat-transfer tube section is positioned fully within the battery cell.

4. The vehicle-battery system of claim 1 wherein the battery cell comprises a battery tab and the heat-transfer tube section is positioned within the battery tab.

5. The vehicle-battery system of claim 1 wherein the heat-transfer tube section is positioned on an outer surface of the battery cell.

6. The vehicle-battery system of claim 1 wherein:
the fluid tube is a first fluid tube and positioned in direct contact with a first battery tab of the battery cell; and
the vehicle-battery system comprises a second fluid tube positioned in direct contact with a second battery tab of the battery cell.

7. The vehicle-battery system of claim 1 wherein:
the fluid tube is a first fluid tube and positioned in direct contact with a first surface of the battery cell; and
the vehicle-battery system comprises a second fluid tube positioned in direct contact with a second surface of the battery cell.

8. The vehicle-battery system of claim 1 wherein:
the fluid tube is a first fluid tube and positioned within the battery cell; and
the vehicle-battery system comprises a second fluid tube positioned within the battery cell.

9. The vehicle-battery system of claim 1 wherein:
the battery cell includes a bus bar; and
the heat-transfer tube section is positioned on and/or within the bus bar.

10. The vehicle-battery system of claim 1 further comprising the heat-transfer fluid, wherein the heat-transfer fluid is surface functionalized, yielding a surface-functionalized heat-transfer fluid, to, in operation of the system, cool or heat the battery cell in a predetermined manner.

11. The vehicle-battery system of claim 10, wherein the heat-transfer fluid includes nanoparticles and the surface-functionalized heat-transfer fluid is surface functionalized by addition of a functional group at a surface of the nanoparticles.

12. The vehicle-battery system of claim 10 wherein nanoparticles of the surface-functionalized heat-transfer fluid have more particle dispersion, or are more isolated, than nanoparticles of the heat-transfer fluid if not surface functionalized.

13. The vehicle-battery system of claim 1 further comprising the heat-transfer fluid, wherein the heat-transfer fluid comprises silicon (Si) nanoparticles with a base fluid.

14. The vehicle-battery system of claim 1 wherein:
the fluid tube comprises a wall having a wall thickness of between about 10 nm and about 1000 µm; and
the fluid tube has an outside diameter between about 1 µm and about 100 µm.

15. The vehicle-battery system of claim 1, wherein the heat-transfer tube section is disposed in a predetermined pattern selected from a group consisting of:
cross-hatched;
a pin;
a spiral or helicoid;
manifold;
serpentine;
parallel; and
interdigitated.

16. The vehicle-battery system of claim 1, wherein: the battery cell is a pouch-type battery cell; and
the heat-transfer tube section is positioned in a pouch portion of the pouch-type battery cell and/or on a surface of the pouch portion.

17. The vehicle-battery system of claim 1, wherein: the battery cell is a prismatic-type battery cell; and
the heat-transfer tube section is positioned at least partially on a surface of the prismatic-type battery cell.

18. The vehicle-battery system of claim 1, wherein the at least one characteristic comprises at least a magnetic polarity of the heat-transfer fluid.

19. The vehicle-battery system of claim 1, wherein the at least one characteristic comprises at least a type of nanoparticles in the heat-transfer fluid.

20. The vehicle-battery system of claim 1, wherein the at least one characteristic modified comprises at least one of:
a concentration of nanoparticles in the heat-transfer fluid; and
a ratio of base fluid-to-nanoparticles of the heat-transfer fluid.

* * * * *